J. S. KINGSBURY.
TRACTION DEVICE FOR VEHICLE WHEELS.
APPLICATION FILED NOV. 27, 1914.
1,211,453.
Patented Jan. 9, 1917.
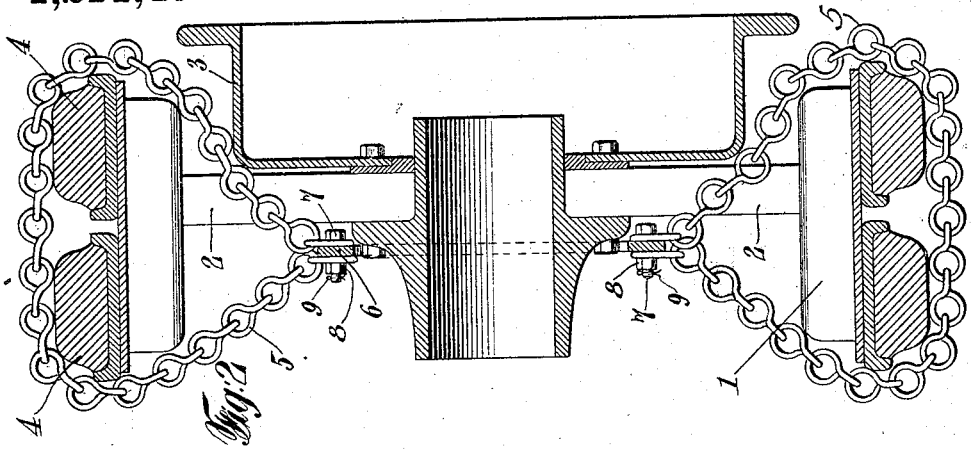
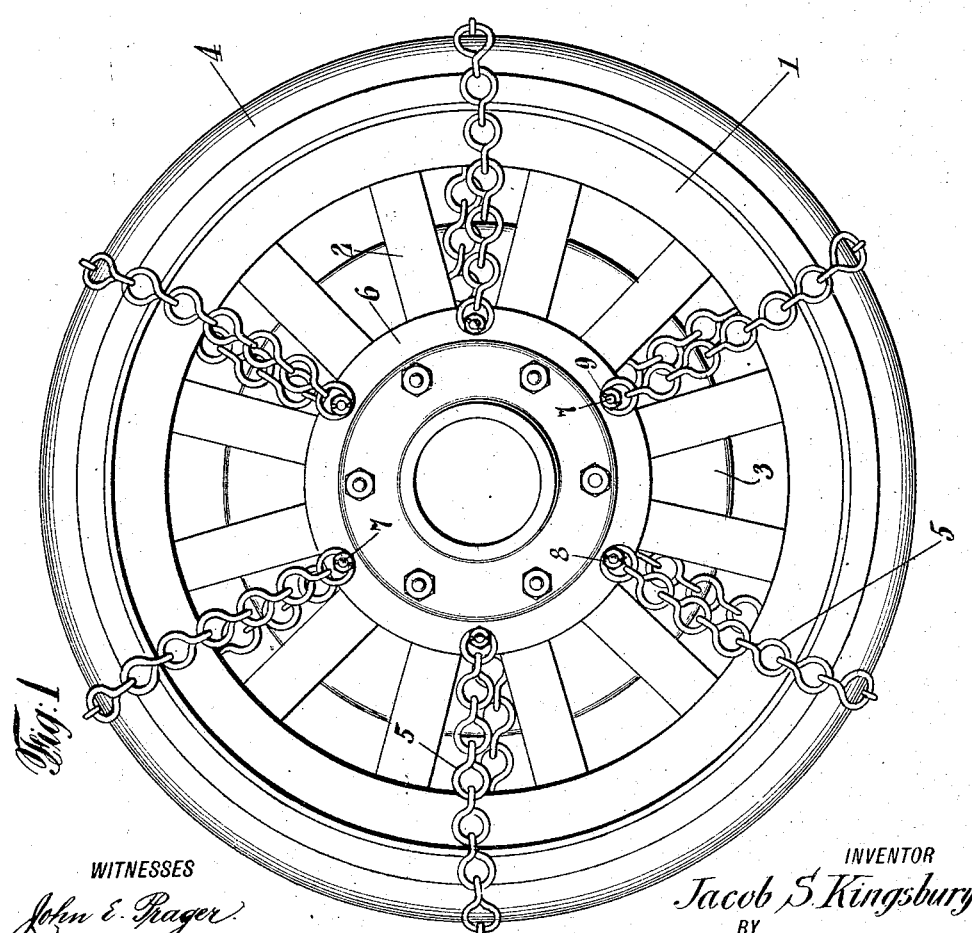
WITNESSES
John E. Prager
A. Worden Gibbs
INVENTOR
Jacob S. Kingsbury
BY
Prindle, Wright & Small ATTORNEYS

UNITED STATES PATENT OFFICE.

JACOB S. KINGSBURY, OF ALBANY, NEW YORK, ASSIGNOR TO KINGSBURY-LEAHY COMPANY, OF ALBANY, NEW YORK, A CORPORATION OF NEW YORK.

TRACTION DEVICE FOR VEHICLE-WHEELS.

1,211,453. Specification of Letters Patent. Patented Jan. 9, 1917.

Application filed November 27, 1914. Serial No. 874,156.

*To all whom it may concern:*

Be it known that I, JACOB S. KINGSBURY, of Albany, in the county of Albany, and in the State of New York, have invented a certain new and useful Improvement in Traction Devices for Vehicle-Wheels, and do hereby declare that the following is a full, clear, and exact description thereof.

My invention relates to traction devices for automobiles.

While my invention relates in general to traction devices for automobiles and vehicles in general, it is especially applicable to motor trucks.

Hitherto, efforts to provide traction devices on the wheels of motor trucks have been unsuccessful. This is due to the great weight of the trucks and partly, also, to the solid tires which are customarily used in connection with vehicles of this type. When attempts have been made previously to apply chains of the ordinary type to wheels of motor trucks, in order to prevent the wheels from slipping, the results have been wholly unsatisfactory, owing to the fact that the wheels would often slip within the chains so that the chains would provide no tractive effect whatever, and owing to the fact, furthermore, that the parts would become frequently broken, due to the very great strains placed upon the chains, and due to the fact that the chains would at times catch in the driving mechanism as, for example, the driving chain, the brake rod, etc., on the automobile.

The object of my invention is to provide an attachment for motor truck wheels which does not slip in operation, and in which the forces are so distributed that the chains forming a part of the device do not become severed under the strains applied, and in which, furthermore, the parts are so arranged that they do not catch in the operating mechanism of the automobile.

While my invention is capable of being embodied in many different forms, for the purpose of illustration I have shown only one form thereof in the accompanying drawings, in which—

Figure 1 is a vertical elevation of a wheel equipped with the traction device; and, Fig. 2 is a vertical section of the same.

In the drawings I have shown a motor truck wheel 1 having spokes 2, and having attached thereto the usual brake casing 3. On the periphery of the wheel there are provided a pair of solid rubber tires 4. At intervals around the wheel 1 chains 5 are located, each of which passes around the periphery of the wheel and has its two ends connected to a floating ring 6 by means of a bolt 7 having a nut 8 and a cotter pin 9 thereon. The chains 5 are preferably so arranged that one end of each of the chains passes between a pair of the spokes 2 in such a manner that the two ends of the chains 5 are connected to the ring 6 located at one side of the spokes 2. It will be observed, as shown in Fig. 1, that the chains are arranged in such a manner that any one chain 5 is diametrically opposite to another one of the chains.

In the operation of the apparatus when the wheel 1 is being rotated by the motor of the automobile, the chains 5 will be tightly gripped against the tires 4, owing to the fact that any one of the chains 5 is diametrically opposite to, and rigidly connected with another one of the chains. The whole construction is, therefore, supported in place with a considerable degree of rigidity. At the same time, the chains 5 that are present in the construction are rather long, so that the desired amount of elasticity is obtained. Furthermore, the fact that the floating ring 6, to which the chains are connected, is located at the outside of the wheel, thus requiring the free ends of the chains to pass from the rear to the front of the wheels, avoids any chance of the chains becoming entangled in the operating parts of the automobile. Furthermore, it will be noted that while each individual chain is capable of considerable lateral movement, this movement does not permit the chain to acquire a position that gives it a small acute angle to the periphery of the wheel. The chains, therefore, invariably tightly grip the periphery of the wheel. This prevents the traction device from rotating as a whole with regard to the wheel as in the case of previous devices where the radially located chains are short and when moved along the periphery of the wheel occupy a small acute angle to the same. Again, the fact that the chains tightly grip the periphery of the wheel tends to prevent the rattling noise which accompanies the former types of chain traction devices during the rotation of the wheel.

While I have described my invention above in detail, I wish it to be understood that many changes may be made therein without departing from the spirit of my invention.

I claim:

1. A traction device for a vehicle wheel, comprising a plurality of radially arranged chains, and a floating ring rigidly connecting the same by both ends of each of the chains.

2. A traction device for a vehicle wheel, comprising a plurality of radially arranged chains, and a floating, rigid ring connecting the same and directly connected to both ends of each of the chains.

In testimony that I claim the foregoing I have hereunto set my hand.

JACOB S. KINGSBURY.

Witnesses:
ARTHUR WRIGHT,
SAMUEL SCHWARTZMAN.

Copies of this patent may be obtained for five cents each, by addressing the "Commissioner of Patents, Washington, D. C."